United States Patent
Eschenbach

(12) 
(10) Patent No.: US 6,546,040 B1
(45) Date of Patent: Apr. 8, 2003

(54) GPS RECEIVER HAVING IMPROVED SIGNAL ACQUISITION AT A LOW SIGNAL TO NOISE RATIO

(75) Inventor: Ralph F. Eschenbach, Woodside, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/295,567

(22) Filed: Apr. 21, 1999

(51) Int. Cl.[7] .................................. H04B 1/69
(52) U.S. Cl. ................. 375/140; 375/130; 375/148; 375/152; 342/357.06; 342/357.12; 342/357.15
(58) Field of Search ................ 375/130, 140, 375/152, 148, 336; 342/357.15, 357.12, 357.06

(56) References Cited

U.S. PATENT DOCUMENTS 5,192,957 A * 3/1993 Kennedy ............... 342/357.12
5,696,762 A * 12/1997 Natali et al. ............... 370/320
5,914,693 A * 6/1999 Takei et al. ................ 343/767
6,044,105 A * 3/2000 Gronemeyer ............... 375/152
6,133,871 A * 10/2000 Krasner ................. 342/357.06
6,188,351 B1 * 2/2001 Bloebaum ............. 342/357.15

* cited by examiner

Primary Examiner—Shuwang Liu
(74) Attorney, Agent, or Firm—David R. Gildea

(57) ABSTRACT

A GPS receiver having a fast acquisition of a GPS signal having a low signal-to-noise ratio. The GPS receiver adjusts a local frequency for iteratively downconverting raw GPS signal samples to baseband GPS signal code data, combining a plurality of code epochs of the GPS signal code data in chunks and super chunks for providing representative code epochs, and correlates the representative code epochs to a replica code epoch for providing correlation times. A microcontroller processes the correlation times for providing the frequency corrections and computes a GPS pseudorange when the error in the corrected local frequency is less than a threshold. The GPS pseudoranges for several GPS satellites are transmitted back to the base for computing the GPS-based location of the GPS receiver.

23 Claims, 6 Drawing Sheets

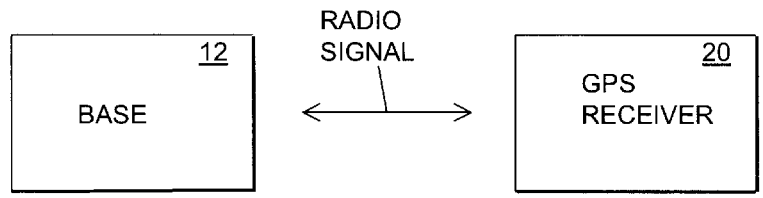
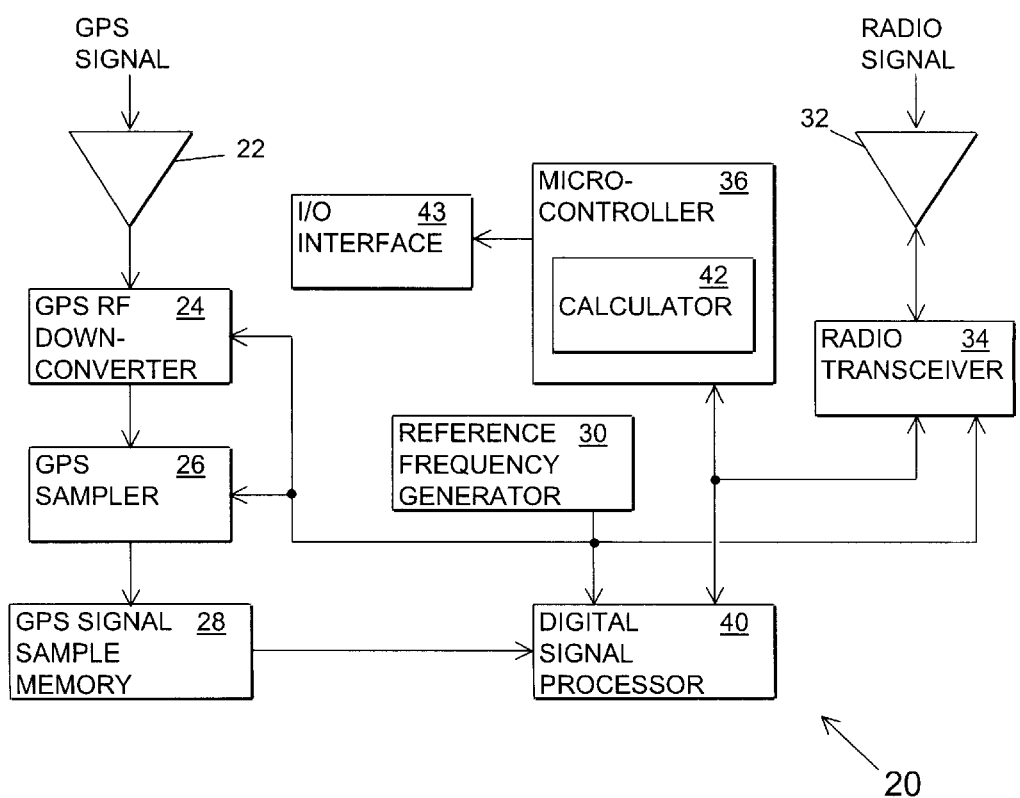
Fig. 1
Fig. 2

GPS RECEIVER HAVING IMPROVED SIGNAL ACQUISITION AT A LOW SIGNAL TO NOISE RATIO

BACKGROUND OF THE INVENTION

1. Field of the Invention

The invention relates generally to GPS receivers and more particularly to a GPS receiver having a fast acquisition of a GPS signal having a low signal-to-noise ratio.

2. Description of the Prior Art

Global positioning system (GPS) receivers have been used for several years for determining geographical location and/or time in commercial applications including navigation, timing, mapping, surveying, machine and agricultural control, vehicle tracking, and marking locations and time of events. Given such wide commercial application, it is clear that GPS receivers provide a good value for many users. However, the global positioning system has been limited in several potential applications because existing GPS receivers are unable to acquire a GPS signal unless the GPS signal has signal-to-noise that is greater than a certain level. Typically, this is not a problem where the GPS receiver is mounted on a platform such as a ship, airplane, farm tractor, or a vehicle traveling on an open highway. However, the signal-to-noise limitations of GPS receivers make it generally impractical to use GPS indoors or where the GPS signal may be blocked by buildings or trees. For example, it might be desirable to obtain a GPS-based location with a handheld GPS receiver indoors or beneath foliage, or with a vehicle mounted GPS receiver in an urban canyon. Further, in order to obtain a high enough signal level, GPS receivers are used with specially designed hemispherical GPS antennas that are positioned to point upward with a clear view toward the sky. This can be inconvenient for the user of a handheld GPS receiver. For example an E911 requirement for cellular phones has mandated that it be possible to determine the location of the phone to within one-hundred twenty-five meters within about five seconds some high percentage of the time. These requirements might be met by a GPS receiver in the cellular phone where the phone was limited to use outside of buildings or automobiles by a user wearing a GPS antenna on his hat or shoulder pad. The GPS antenna would then somehow be connected from the hat or shoulder pad to the GPS receiver in the cellular phone. However, it is not expected that such an approach would be acceptable except in special circumstances. In order to meet the needs of these and other similar applications, there is a need for a GPS receiver having a fast signal acquisition for a signal having a low signal-to-noise.

SUMMARY OF THE INVENTION

It is therefore an object of the present invention to provide a global positioning system (GPS) receiver having a rapid acquisition of an incoming GPS signal having a low signal-to-noise ratio by combining epochs in chunks of GPS signal code data.

Briefly, in a preferred embodiment, a system of the present invention includes a base station and a GPS receiver. The GPS receiver includes a transceiver for radio communication with the base. The GPS receiver enters an operational mode from a low power standby mode when a user keys the GPS receiver to transmit a radio signal to the base or a radio signal from the base awakens the GPS receiver. The base transmits a radio signal having an accurate frequency and information for time, location, GPS Doppler frequency shifts, and GPS data to the GPS receiver. The GPS receiver uses the radio signal frequency and the GPS information for acquiring the GPS signal and computing GPS pseudoranges. The transceiver then transmits the pseudoranges in a radio signal back to the base and the GPS receiver returns to the standby mode. The base uses the pseudoranges for computing the geographical location of the GPS receiver.

The GPS receiver in a preferred embodiment includes a GPS signal sample memory, a digital signal processor, a microcontroller, and a reference frequency generator. The microcontroller and the transceiver determine a frequency adjustment based upon the information in the radio signal and a comparison of the radio signal frequency with a reference frequency generated by the reference frequency generator. The GPS signal sample memory receives and stores raw GPS signal samples for a sample time period of preferably about one second. The digital signal processor uses the frequency adjustment and subsequent frequency corrections determined within the GPS receiver for processing and re-processing the same stored raw GPS signal samples in order to provide successively more accurate correlation times. The microcontroller uses the correlation times for determining and providing successively finer frequency corrections as feedback to the digital signal processor. When the frequency adjustments and corrections have caused a local frequency to match the frequency of the incoming GPS signal to within a selected threshold, the microcontroller uses a correlation time for computing a GPS pseudorange. Preferably, several GPS pseudoranges are computed in parallel corresponding to several GPS satellites, respectively.

The digital signal processor preferably includes a numerically controlled signal generator, a frequency converter, a combiner, and a correlator for processing the stored raw GPS signal samples with several passes. In a first pass, the signal generator derives a local frequency from the reference frequency and adjusts the local frequency according to the frequency adjustment based on the radio signal frequency and GPS information from the base. The frequency converter uses the pre-adjusted local frequency for frequency converting the raw GPS signal samples to GPS signal code data at baseband. The combiner uses time synchronization based upon the time and location information from the base for combining epochs of GPS signal code data at like phase offsets within the epochs in order to form representative code epochs. Blocks of GPS signal code data that are combined are termed chunks. Preferably the chunks are about ten to twenty code epochs in length. The correlator correlates the chunk representative epochs to a replica code epoch and provides correlation levels and times. The microcontroller includes a calculator for interpolating the correlation times for the highest correlation levels, calculating a correlation time difference across the signal sample time period, and using the correlation time difference for determining a corresponding frequency correction.

In a second pass, the signal generator corrects the local frequency according to the frequency correction determined in the first pass. The frequency converter uses the corrected local frequency for re-converting the stored raw GPS signal samples to baseband for a second set of GPS signal code data. The combiner uses synchronization based upon the correlation times determined in the first pass and information for polarities of GPS data received from the base for combining epochs of the second GPS signal code data at like phase offsets within the epochs in order to form representative code epochs for larger blocks of GPS signal code data termed super chunks. Preferably the super chunks are about one-hundred to one-thousand epochs in length. The correlator correlates the super chunk representative epochs to the replica epoch and provides correlation levels and times. The calculator interpolates the correlation times for the highest correlation levels, calculates the difference in correlation times across the signal sample time period, and uses the correlation time difference for determining a second frequency correction. The first and/or the second passes may be repeated until frequency corrections are less than predetermined thresholds.

In a third pass, the signal generator corrects the local frequency according to the frequency correction determined in the second pass. The frequency converter uses the second pass corrected local frequency for re-converting the stored raw GPS signal samples and providing a third set of GPS signal code data. The combiner combines epochs of the third GPS signal code data at like phase offsets within the epochs for all the epochs in the third GPS signal code data into one combined representative epoch. The correlator correlates the combined representative epoch to the replica epoch for determining combined correlation times and levels. The calculator interpolates the correlation times for the highest correlation levels and uses the interpolated correlation time for determining the GPS pseudorange. The GPS pseudoranges to several GPS signal transmitters may be determined in this way in parallel or the frequency corrections and correlation times for a first acquired GPS transmitter may be used to speed the acquisition of subsequent GPS transmitters. Rapid GPS signal acquisition is obtained because only one time period of raw GPS signal samples is required to be received from the GPS signal. Then, raw GPS signal samples may be processed by the digital signal processor and microcontroller at a rate that is fast compared to the rate at which new time periods would otherwise be received in the GPS signal.

In general, the signal-to-noise ratio at which the incoming GPS signal can be acquired depends upon the length of the chunks because the process of combining the epochs tends to reinforce the signal energy while averaging the noise energy to zero. The longer the chunks, the lower the incoming signal-to-noise ratio at which the GPS signal can be acquired. For example, processing a representative epoch for a chunk of ten epochs enables the GPS receiver of the present invention to acquire an incoming GPS signal at about ten decibels lower signal-to-noise as compared to a GPS receiver processing single epochs while processing a representative epoch for a chunk of one-hundred epochs enables the GPS receiver of the present invention to acquire an incoming GPS signal at about twenty decibels lower signal-to-noise. However, there is a limit to the length of the chunks that may be processed that is determined by the difference between the frequency of the incoming GPS signal and the local frequency within the GPS receiver that is used for converting the GPS signal to baseband. This can be understood by noting that the frequency difference between the local frequency and the GPS frequency causes inversions in the GPS signal code data at a time period of one-half the inverse of the frequency difference. For example, a frequency difference of fifty Hertz causes the baseband GPS signal code data to invert each ten milliseconds. When one of these inversions occurs within a chunk, a given length of the GPS signal code data before the inversion cancels the signal energy in the same length of the GPS signal code data after the inversion, thereby reducing or eliminating the utility of combining epochs of GPS signal code data to obtain a representative epoch. For a fifty Hertz accuracy for the pre-adjusted local frequency (ten milliseconds inversions) a chunk can include ten epochs (ten milliseconds) because either I GPS signal code data or Q GPS signal code data will typically have a preponderance of GPS signal code data of the same inversion. For a five Hertz accuracy, a chunk can include one-hundred epochs (one-hundred milliseconds); or for a one-half Hertz accuracy a chunk can include one-thousand epochs (one second). Accordingly, in a preferred embodiment, when the radio signal frequency and the GPS information enable the local frequency to be accurate to about fifty Hertz, the GPS receiver processes chunks of ten epochs for determining correlation times for correcting the local frequency. When the local frequency is accurate to about five Hertz, the GPS receiver processes super chunks of about one-hundred epochs for determining more accurate and less noisy correlation times for further correcting the local frequency. When the local frequency is accurate to about one-half Hertz the GPS receiver processes a combined one-thousand epochs to determine a still more accurate and less noisy correlation time. The pseudorange to the transmitter of the incoming GPS signal is mathematically derived from the correlation time. In a preferred embodiment the correlation time for one-thousand epochs or one second of GPS signal code data is used for determining a pseudorange having sufficient accuracy and low noise.

In one preferred embodiment, the GPS receiver includes a GPS antenna having a substantially omni-directional radiation pattern. Such GPS antenna necessarily has a low antenna gain. However, the GPS receiver of the present invention has an improved capability for acquiring a GPS signal having a low signal level, thereby enabling the present GPS receiver to use a GPS antenna having a low antenna gain for receiving an airwave GPS signal.

An advantage of the GPS receiver of the present invention is that rapid GPS signal acquisition is obtained for a GPS signal having a low signal-to-noise ratio by combining chunks of epochs of GPS signal code data, thereby improving the likelihood that the GPS signal can be acquired indoors or beneath foliage.

Another advantage of the GPS receiver of the present invention is that a substantially omni-directional antenna can be used, thereby enabling a user to use the GPS receiver without regard to the directional orientation of the GPS receiver.

These and other objects and advantages of the present invention will no doubt become obvious to those of ordinary skill in the art after having read the following detailed description of the preferred embodiments which are illustrated in the various figures.

BRIEF DESCRIPTION OF THE DRAWINGS

FIG. 1 is a block diagram of a system of the present invention including a GPS receiver for acquiring a GPS signal;

FIG. 2 is a block diagram of the GPS receiver of FIG. 1 including a digital signal processor;

DETAILED DESCRIPTION OF THE PREFERRED EMBODIMENTS

Figure 3:
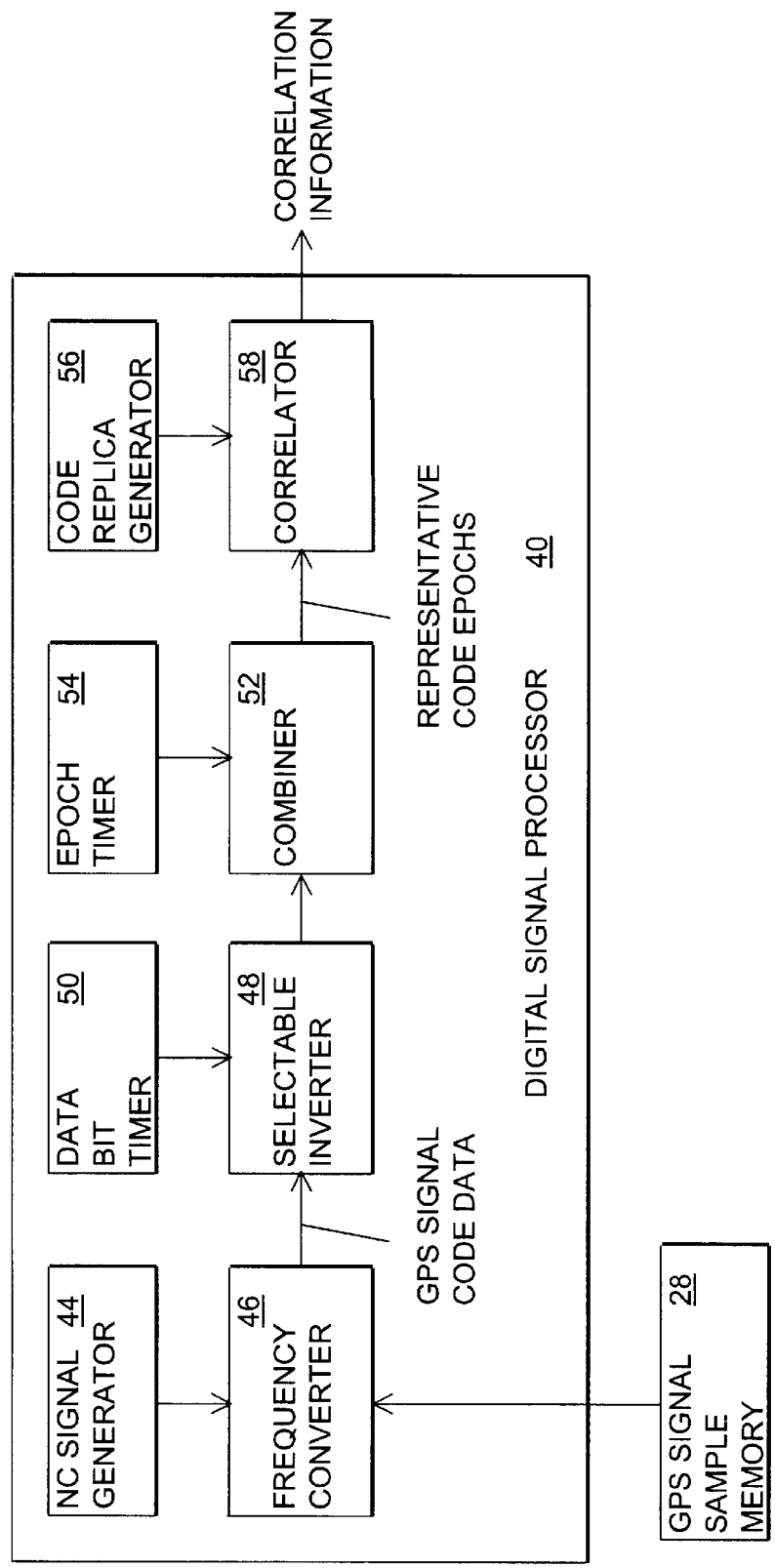
FIG. 3 is a block diagram of the digital signal processor of FIG. 2.

FIG. 1 is a block diagram of a system of the present invention referred to by the general reference number 10.

The system 10 includes at least one base 12 and at least one remote global positioning system (GPS) receiver 20 having a low power standby mode and an operational mode. The base 12 transmits a radio signal having a carrier having an accurately known frequency and modulated information for a current time, an approximate location of the GPS receiver 20, Doppler frequency shifts for GPS signals from GPS satellites that have a line-of-sight to the location, and time-tagged GPS data bits. Preferably, the time is accurate to better than about fifty microseconds with respect to GPS time, the location to better than about ten miles of the GPS receiver 20, and the radio frequency to better than about fifty Hertz. In an exemplary case, where the base 12 is a cell site transceiver, the location of the cell site may typically be used as the location of the GPS receiver 20. Alternatively, the radio signal may include information for the last known location of the GPS receiver 20 or the last known location can be stored in the GPS receiver 20. Known frequency errors in the GPS satellites and/or pseudolites may also be included. Although the preferred embodiment is described in terms of the global positioning system, the structural elements and methods described herein are applicable to other direct sequence spread spectrum (DSSS) systems having code epochs such as the global orbiting navigation system (GLONASS) and code division multiple access (CDMA) communication systems.

Normally, the GPS receiver 20 is disposed in the standby mode. The operational mode is initiated either by a user causing a radio signal having a fix request to be transmitted to the base 12 or the base 12 transmitting a wakeup call in the radio signal to the GPS receiver 20. In the operational mode, the GPS receiver 20 uses the frequency and information in the radio signal for rapidly acquiring the GPS signals from a constellation of GPS satellites and/or pseudolites even when the level is relatively low of the GPS signals. The GPS receiver 20 then determines pseudoranges to one or several of the satellites and/or pseudolites and transmits information for the pseudoranges back to the base 12. When the pseudoranges have been transmitted, the GPS receiver 20 returns to the standby mode. The base 12 uses the pseudoranges for determining the location of the GPS receiver 20. In an exemplary case, the base 12 is a cell site transceiver for transmitting and receiving radio signals in the form of cellular telephone signals.

FIG. 2 is a block diagram of the global positioning system (GPS) receiver of the present invention referred to by the general reference number 20. The GPS receiver 20 includes a GPS antenna 22, a GPS radio frequency (RF) downconverter 24, a GPS sampler 26, a GPS signal sample memory 28, and a reference frequency generator 30. The GPS antenna 22 is tuned for receiving broadcast airwave GPS signals from a constellation of GPS satellites and/or GPS pseudolites and issuing a responsive conducted GPS signal to the GPS RF downconverter 24. Optionally, the GPS antenna 22 has a radiation pattern that is substantially omni-directional. An antenna having a perfectly symmetrical omni-directional radiation pattern has an antenna gain of zero decibel (dB). An antenna having an antenna gain of about one and one-half dB or less may be considered substantially omni-directional. Such antenna may be of the type known as a microstrip where the microstrip has length and width dimensions that are small relative to the frequency of the GPS signal. A dipole or a whip type antenna may also be used in some applications. The GPS RF downconverter 24 includes one or more internal signal sources for providing signals that are mixed with the GPS signal for downconverting the frequency of the GPS signal to an intermediate frequency (IF) and passing the IF GPS signal to the sampler 26.

The sampler 26 includes an in-phase (I) sampler driven by an I sampling signal and a quadrature-phase (Q) sampler driven by a Q sampling signal for issuing I and Q GPS signal samples having one or more bits of resolution. The I and Q signal samples are stored in the GPS signal sample memory 28 as raw GPS signal samples for a certain sample time period, preferably about one second. These raw GPS signal samples are processed several times in order to determine and correct a residual local frequency error due the differences between the reference frequency and GPS-based frequency and between Doppler frequency shift information received from the base 12 (FIG. 1) and actual Doppler frequency shifts. Once the local frequency error has been corrected, the GPS receiver 20 determines the GPS pseudoranges between the GPS antenna 22 and the GPS satellites and/or pseudolites. Preferably, the sampling rate of the I and Q sampling signals is about two megahertz or greater. The GPS signal sample memory 28 has a storage capacity of about four megabits for each bit of resolution in the I and Q signal samples for a two megahertz sampling rate and one second of samples. The frequencies of the sampling signals and the internal signal sources used for downconverting are derived from a reference frequency provided by the reference frequency generator 30. When the raw GPS signal samples have been stored in the GPS signal sample memory 28, the GPS RF downconverter 24 and the sampler 26 may be switched to a standby mode.

The GPS receiver 20 further includes a radio antenna 32, a radio transceiver 34, a microcontroller 36, and a digital signal processor 40. The radio antenna 32 is tuned for receiving a certain radio signal from the base 12 (FIG. 1) and passing a conducted representation of the radio signal to the radio transceiver 34. The radio transceiver 34 is constructed for demodulating and decoding a pre-determined modulation and data format in the radio signal having information for the location of the GPS receiver 20, time, and Doppler frequency shifts or frequency errors expected from the GPS satellites and/or pseudolites from which GPS signals are expected to be received. The radio transceiver 34 receives the reference signal from the reference frequency generator 30 and compares the reference frequency to the frequency of the radio signal in order to determine an initial estimate of the reference frequency error and provide information for the estimate to the microcontroller 36. The microcontroller 36 uses the reference frequency error estimate for providing an initial frequency adjustment to the digital signal processor 40 for acquiring a GPS signal.

The digital signal processor 40 processes the raw GPS signal samples stored in the GPS signal sample memory 28 using a local frequency for downconverting the raw GPS signal samples to GPS signal code data at baseband and passes correlation information to the microcontroller 36 as described below in the detailed descriptions accompanying FIGS. 3, 4 and 5a–c. The microcontroller 36 includes a calculator 42 for using the correlation information for providing a feedback correction to the digital signal processor 40 for correcting the residual frequency error in the local frequency. When the residual frequency error is less than a threshold, preferably about one-half Hertz for one second of GPS signal code data, the microcontroller 36 determines pseudoranges to one or preferably at least four of the GPS satellites and/or pseudolites from which GPS signals are broadcast by interpolating the correlation times for code phase adjustments in a replica code that results in the highest correlations with the GPS signal code data. The pseudoranges are then passed to the radio transceiver 34 for transmission back to the base 12 (FIG. 1). An input/output (I/O)

interface 43 interconnected with the microcontroller 36 typically includes a display and a keypad for use by a human user. The microcontroller 36 operates in a conventional manner for receiving signals and issuing signals having information and directives for coordinating the activities of the GPS RF downconverter 24, GPS sampler 26, GPS signal sample memory 28, and reference frequency generator 30 as well as the radio transceiver 34, the digital signal processor 40, and the I/O interface 43. Depending upon the clock rates for the digital signal processor 40 and the microcontroller 36, the same raw GPS signal samples can be processed as often as required much more rapidly than the time to accumulate new GPS signal samples from the GPS signal, thereby greatly reducing the time for GPS signal acquisition.

Figure 5A:
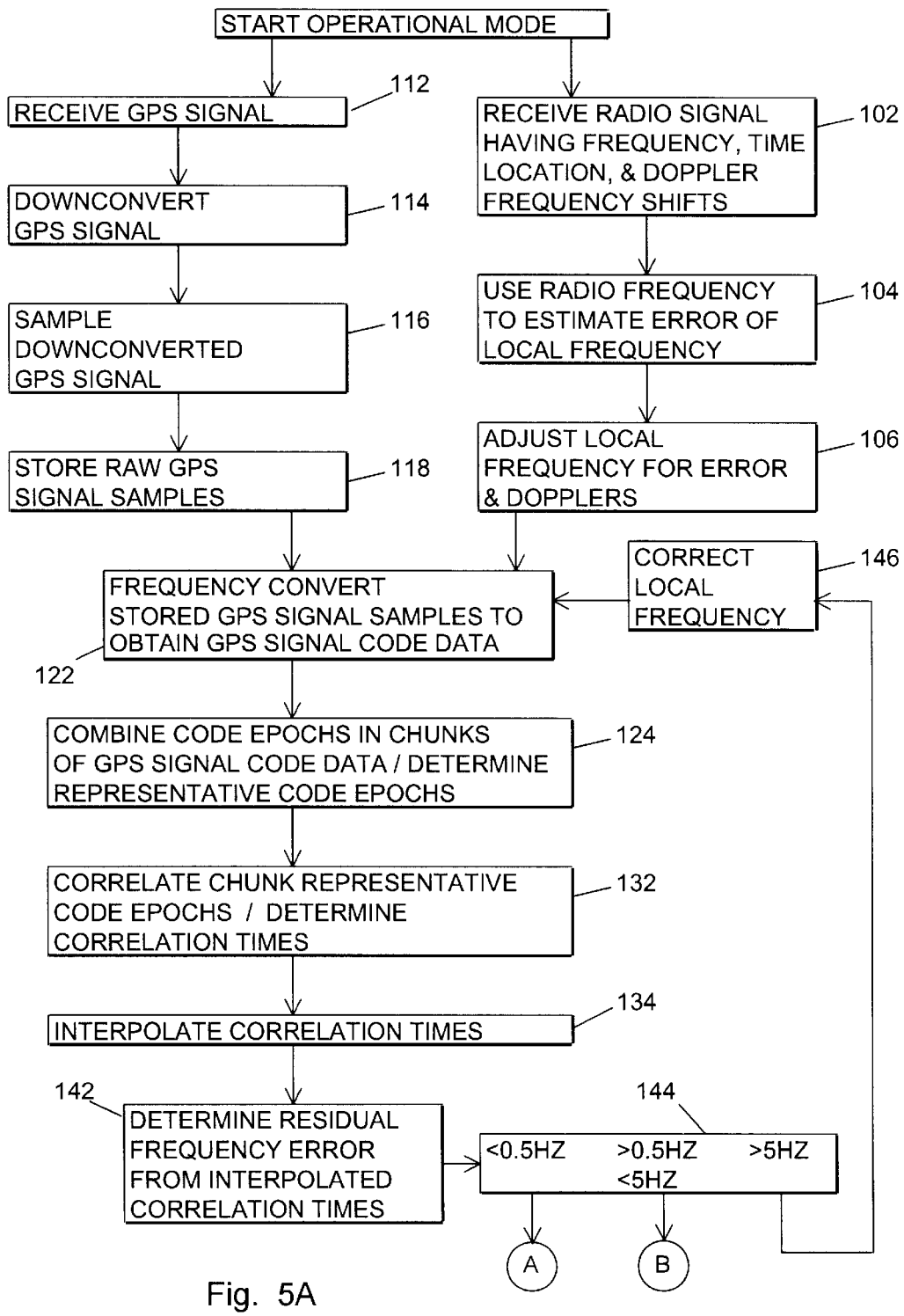
FIGS. 5a–c illustrate a flow chart of a method using the GPS receiver of FIG. 1 for acquiring a GPS signal.
Figure 5B:
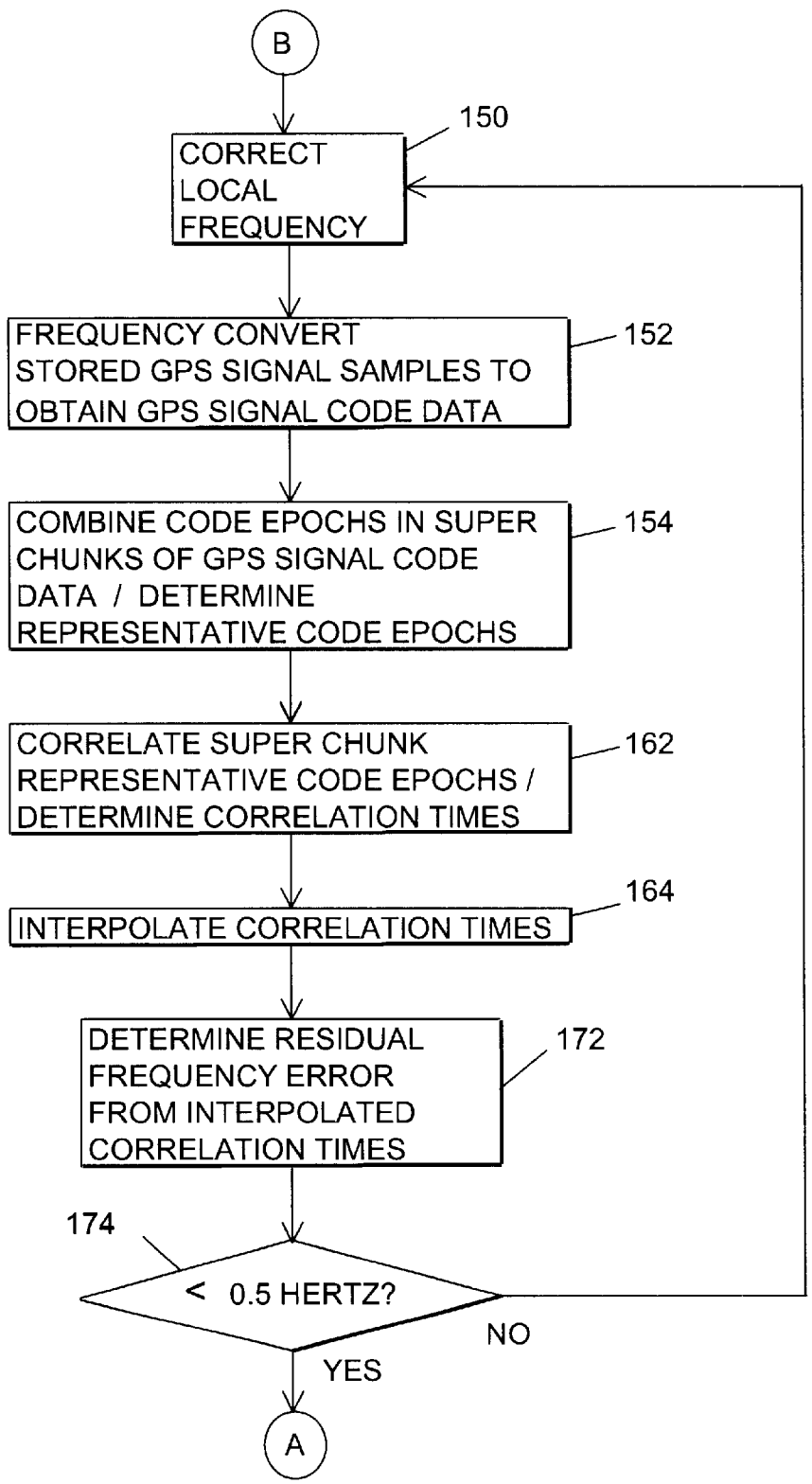
Figure 5C:
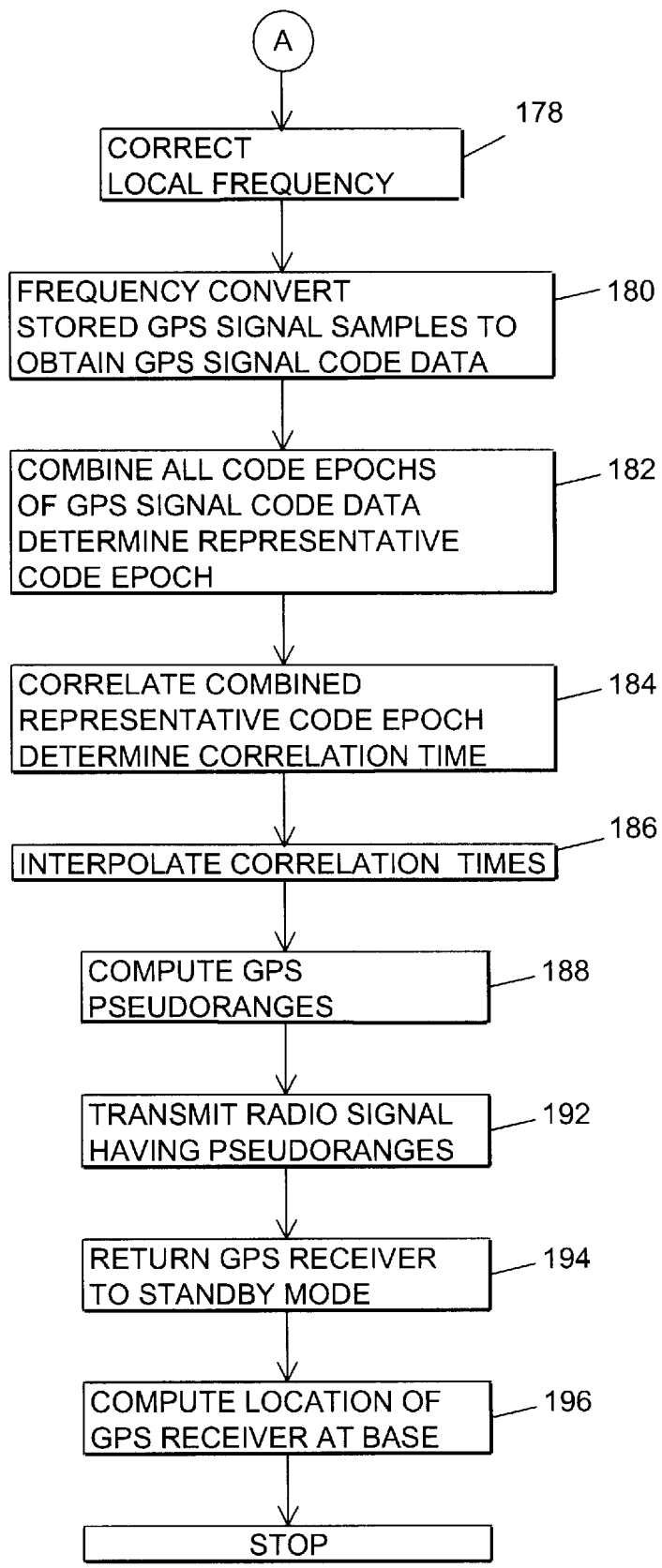

FIG. 3 is a block diagram of the digital signal processor 40 of the present invention for processing the raw GPS signal samples stored in the GPS signal sample memory 28 and providing correlation information from which a residual local frequency error and then GPS pseudoranges can be determined. The digital signal processor 40 includes a numerically controlled (NC) signal generator 44, a frequency converter 46, a selectable inverter 48, a data bit timer 50, a combiner 52, an epoch timer 54, a correlator 58, and a code replica generator 56. The NC signal generator 44 provides a local NC signal having a numerically controlled frequency that is based upon the reference frequency from the reference frequency generator 30 (FIG. 2) and adjusted by the initial frequency adjustment and then by feedback corrections from the microcontroller 36 (FIG. 2). The frequency converter 46 multiplies the raw GPS signal samples stored in the GPS signal sample memory 28 by the NC signal in order to frequency downconvert the GPS signal samples to baseband to obtain GPS signal code data. A more detailed description of a preferred operational method used by the digital signal processor 40 is illustrated in FIGS. 5*a–c* and described in the accompanying description below.

Figure 4:
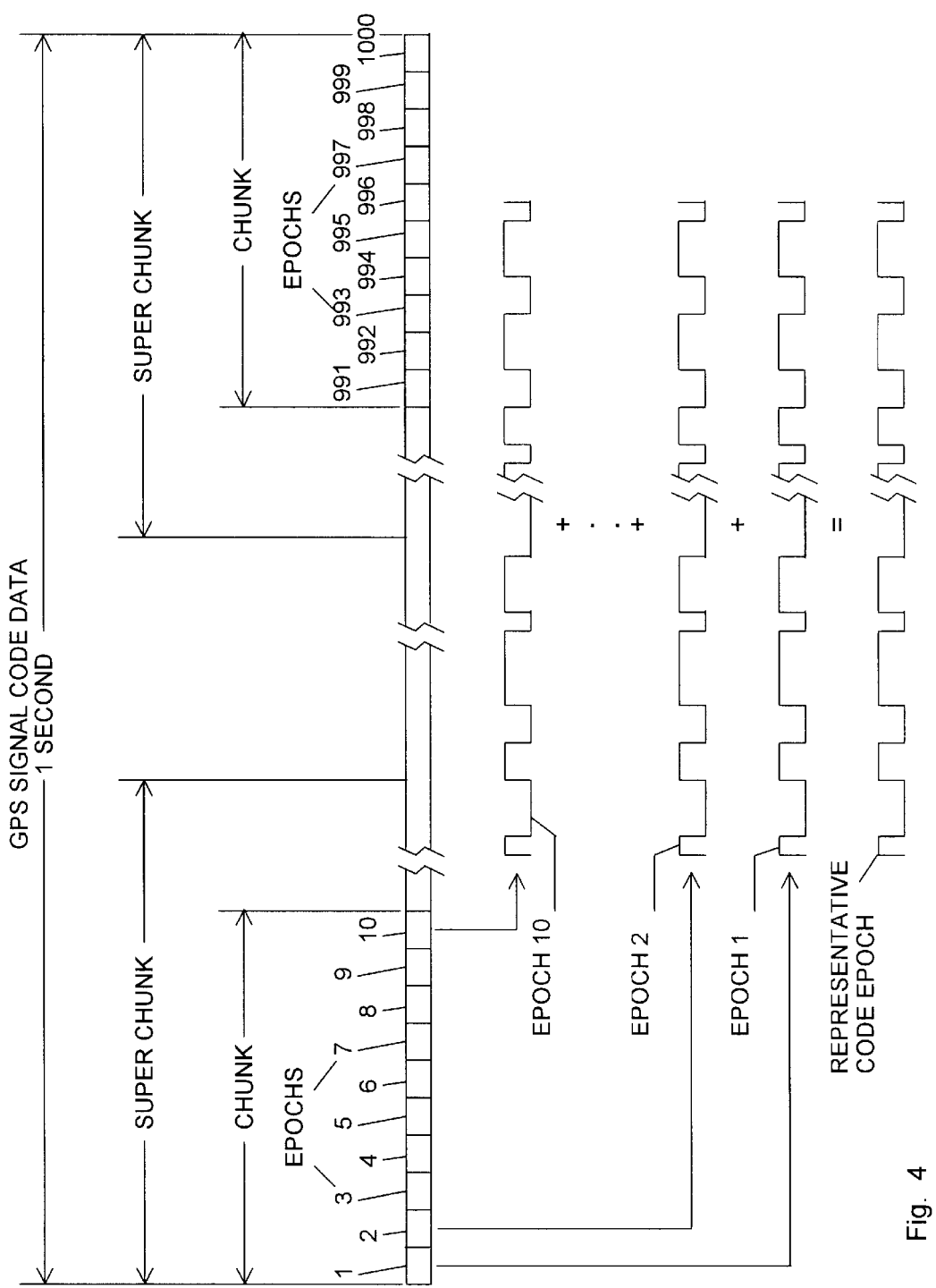
FIG. 4 is a signal chart of signal code data that is processed by the GPS receiver of FIG. 1.

FIG. 4 is an illustrative signal chart of GPS signal code data. The GPS signal data code includes repeating one millisecond code epochs of a pseudorandom (PRN) code corresponding to the PRN code for a GPS satellite or pseudolite. One second of signal code data includes one thousand epochs of which epochs 1–10 and 991–1000 are referenced in the illustration. An exemplary PRN code data pattern is illustrated for epochs 1, 2, and 10. Blocks of GPS signal code data of arbitrary length are designated as chunks and longer blocks of GPS signal code data of arbitrary length are designated as super chunks. Preferably, but not necessarily, the chunks and super chunks have integer numbers of epochs. In a preferred embodiment the chunk is ten to twenty epochs (ten to twenty milliseconds) and the super chunk is one-hundred to one-thousand epochs (one-hundred to one-thousand milliseconds). A representative code epoch is a best estimate of the signal code data in the epochs within the chunk or super chunk. Preferably, the representative epoch is obtained by adding or averaging the signal code data at like phases within the epochs.

The illustration of the FIG. 4 has several simplifications in order that the essential issues be easier to understand. First, there are actually two signal code data patterns, one for I signal code data and another for Q signal code data. Each of the I and Q signal code data are processed within the digital signal processor 40. Second, the epoch patterns as illustrated for epochs 1, 2, and 10 are shown as bi-level signals. However, the actual epoch patterns may have four or more levels corresponding to two or more bit resolution. Third, the epoch patterns that are shown as bi-level signals may be carried as modulation on a pseudo-baseband or intermediate frequency carrier signal. Fourth, and most important, epoch patterns are in reality extremely noisy. It is this noisiness that that causes the present invention to be beneficial by combining several epochs in order to average out the noise and obtain a representative epoch where a very small bias toward correct code data may be observed.

Returning to FIG. 3, the GPS signal code data is either inverted or not inverted in the selectable inverter 48 as controlled by the data bit timer 50 depending upon the polarity of the time-tagged GPS data bit obtained in the radio signal from the base 12 (FIG. 1) for that portion of the signal code data. Alternatively, the time tagged data bits can derived from current correlation information, estimated from knowledge of time and the GPS data structure, or stored in the microcontroller 36 (FIG. 2) from a previous time when the GPS data bits were obtained. The selectable inverter 48 then issues the inverted or non-inverted GPS signal data code to the combiner 52. The combiner 52 combines code epochs in chunks or super chunks of the GPS signal code data for providing representative code epochs that are a best estimate of the code epochs within the respective chunks or super chunks.

The epoch timer 54 uses the time and location information received from the base 12 (FIG. 1) in the radio signal for providing timing signals in order to align the starts of the chunks and super chunks to the starts of GPS code epochs and data bits. The representative epochs are passed to the correlator 58. The correlator 58 compares the representative epochs to a replica epoch provided by the code replica generator 56 and issues the correlation levels to the microcontroller 36 (FIG. 2). The code replica generator 58 increments the replica code in chip or sub-chip increments having phase or time offsets that are caused or tracked by the microcontroller 36 (FIG. 2). The microcontroller 36 (FIG. 2) tracks the correlation levels and the time offsets and interpolates the correlations levels in order to determine the correlation times for the chunk and super chunk representative epochs having the highest level of correlation.

The microcontroller 36 (FIG. 2) includes a calculator 42 (FIG. 2) for using the difference in correlation times across the time period of the GPS signal code data for determining a residual local frequency error and applying frequency adjustments and corrections to the NC signal generator 44 for adjusting and correcting the numerically controlled frequency. The frequency converter 46 then uses the adjusted and corrected numerically controlled frequency of the NC signal for re-converting the same raw GPS signal samples for providing new GPS signal code data. The process of combining chunks or super chunks of epochs for determining representative epochs, correlating the representative epochs to the replica epoch for determining correlation times, interpolating the correlation times for determining the local residual frequency error, and correcting the local frequency is iterated until the frequency error is less than a threshold. When the local frequency error is less than the threshold, the microcontroller 36 (FIG. 2) computes a GPS pseudorange from the correlation times. Preferably, the above described process is implemented using parallel hardware in the digital signal processor 30 so that the pseudoranges to several GPS satellites and/or pseudolites can be computed nearly simultaneously. Of course, as is well-known in the art, the frequency error determined for a first GPS satellite and/or pseudolite can be used to improve the estimate of the frequency errors for the other GPS satellites and/or pseudolites.

FIGS. 5*a–c* illustrate a flow chart of a method for acquiring a GPS signal in the GPS receiver 20 and then determining and transmitting pseudoranges to the base 12. At the start, either the operator of the GPS receiver 20 transmits a radio signal to the base 12 in response to a key action through the I/O interface 43 or a radio signal initiated by the base 12 switches the GPS receiver 20 from standby mode to operational mode. In a step 102 the radio antenna 32 and radio transceiver 34 receive a communication radio signal having an accurate carrier or subcarrier frequency from the base 12. The radio signal includes information for time, approximate location of the GPS receiver 20, Doppler frequency shifts of the GPS signals from GPS satellites and/or pseudolites that are positioned for reception at that time and location, and time-tagged GPS data bits. Preferably, the time is accurate with respect to GPS time to better than about fifty microseconds, the location to better than about ten miles of the GPS receiver 20, and the radio frequency to better than about fifty Hertz. Known frequency errors in the GPS satellites or pseudolites and/or GPS information such as GPS satellite health may also be included.

In a step 104 the radio transceiver 34 uses the frequency in the radio signal for estimating the frequency error of the reference frequency from the reference frequency generator 30. In a step 106 the numerically controlled (NC) signal generator 44 adjusts the frequency of the NC signal to compensate for the estimated frequency error and the predicted Doppler frequency shifts. In a step 112, concurrently with the step 102, the GPS antenna 22 receives the GPS signals from a constellation of GPS satellites and/or pseudolites. In a step 114 the GPS RF downconverter 24 frequency downconverts the GPS signals. In a step 116 the sampler 26 samples the downconverted GPS signals. In a step 118 raw GPS signal samples are stored in the GPS signal sample memory 28. In order to conserve power the GPS RF downconverter 24 and the GPS sampler 26 can be returned to the low power standby mode at this time.

In a step 122 the frequency converter 46 frequency downconverts the stored raw GPS signal samples to baseband by multiplying the samples by a local numerically controlled (NC) signal from the NC signal generator 44 in order to provide the GPS signal code data. It is understood by those in the art that the GPS signal is a direct sequence spread spectrum (DSSS) signal having repeating sequences termed code epochs. A GPS code epoch is a sequence of pseudorandom (PRN) code that spreads the frequencies of the energy in the GPS signal. Each GPS satellite or pseudolite transmitter has a distinct PRN code thereby enabling the GPS signal energy from one GPS transmitter to be distinguished from the GPS signal energy from another. There are several codes used in GPS. An epoch of the PRN C/A code is 1023 chips and the time period for the epoch is one millisecond. A GPS data bit having one bit of GPS location-determination information multiplies the PRN code by plus or minus one. Each GPS data bit is twenty milliseconds and twenty epochs long with a transition synchronized to the start of every twentieth epoch starting with a known epoch at a known time.

In a step 124 the epoch timer 54 provides a timing signal for segmenting the GPS signal code data into chunks where each chunk is ten code epochs long (ten milliseconds). The time information received in the radio signal from the base 12 is used by the epoch timer 54 to align the chunks approximately to the starts (and ends) of epochs at potential transitions of GPS data bit polarity reversals. The combiner 52 uses the timing signal from the epoch timer 54 for combining the epochs in each of the chunks as illustrated in FIG. 4 and described in the accompanying description to form a representative code epoch. Processing the representative epochs for chunks of ten epochs enables the GPS receiver 20 to acquire the GPS signal at about a ten decibel lower signal-to-noise ratio than processing a single epoch. For a chunk of greater than twenty epochs the selectable inverter 48 inverts or non-inverts the groups of twenty epochs according to the polarity of the expected GPS data bit from the data bit timer 50 before the epochs are combined. For one second of GPS signal code data for chunks of ten epochs each, there are potentially one-hundred representative epochs. Preferably, all one-hundred representative epochs are determined and then processed in the steps below in order to gain the most immunity from noise. However, as a minimum it is only required that two representative epochs be processed. For example, a starting representative epoch may be determined by combining a chunk of epochs at the start of the GPS signal code data and an ending representative epoch may be determined by combining a chunk of epochs at the end of the GPS signal code data while the interior chunks of epochs may be ignored.

In the step 132 the correlator 58 correlates the chunk representative epochs against a replica of the epoch from the code replica generator 56 by comparing the chunk representative epoch to one phase or time offset and then another of the replica epoch until the phases are found that have the highest correlation. Because the time period for the epoch is known, the terms "phase" and "time" with regard to the epoch are often used interchangeably with the understanding that they are related by a constant. Typically, in order to find the best correlation times (the correlation times resulting in the highest correlations), the replica epoch is incrementally offset in sub-chip increments. The number of phase or time offsets that may be required to be tested depends upon the accuracy with which the phase or time offset of the replica is known beforehand which, in turn, depends upon the accuracy with which GPS-based time and location are known. For example, for a GPS-based time ambiguity of fifty microseconds and a location ambiguity of ten miles, the replica can be pre-set to approximately plus or minus one-hundred microseconds so that a range of only approximately two-hundred of a possible one-thousand twenty-three phase chips of the GPS PRN epoch must be tried. Once the correlation time is found for any one of the chunk representative epochs, the search can be narrowed for finding the correlation times for the other representative chuck epochs. Preferably, correlation times are determined for all the chunk representative epochs. However, as a minimum it is only required that correlation times be determined for two chunks. When the polarities of the time-tagged expected GPS data bits are not available in the radio signal from the base 12, they can be determined here from the non-inverted or inverted correlation and then used in a step 154 below.

In a step 134 in order to improve time measurement resolution, the microcontroller 36 interpolates the correlation times for the correlations having the highest levels for each of the respective chunk representative epochs. Alternatively, only the first and last chunks of epochs of GPS signal code data are combined, correlated, and interpolated as above for determining first and last chunk correlation times. In a step 142 the microcontroller 36 determines a correlation time difference that best fits the difference of the interpolated correlation times across the raw GPS signal sample time period. For example, the correlation time difference may be determined from the set of equations shown in table 1.

$t_1 = Tc$ $t_2 = Tc + \Delta t/99$ $t_3 = Tc + 2\Delta t/99$ $t_4 = Tc + 3\Delta t/99$

.

.

$t_{100} = Tc + \Delta t$

Table 1

In the table 1, $t_1$ through $t_{100}$ are the interpolated correlation times for the chunk representative epochs for the first through one-hundredth chunk of the GPS signal code data, Tc is a fixed component of the correlation time and $\Delta t$ is the correlation time difference that accumulates during the time period for the GPS signal samples. Only two of the one-hundred correlation times $t_1$ through $t_{100}$ would be necessary for computing the time Tc and the time difference $\Delta t$. For example, time difference $\Delta t$ can be computed by differencing correlation time $t_1$ and correlation time $t_{100}$. However, the GPS signal is noisy so that better results are usually obtained by a best fit to many or all of the equations in the table 1 using a technique such as least squared deviation. When the time difference $\Delta t$ is small, the time Tc can be converted to pseudorange by multiplying the time Tc by the speed of light. The residual frequency error is determined by multiplying the time difference $\Delta t$ by the carrier frequency of the GPS signal and dividing by the time period over which the time difference $\Delta t$ occurs as shown in equation 1.

$$\Delta F = F_c \times \Delta t / Tp \qquad 1)$$

The equation 1 shows that the residual frequency error $\Delta F$ equals a carrier frequency $F_c$ of the GPS signal times the correlation time difference $\Delta t$ divided by the time period Tp for the GPS signal code data. For a GPS carrier frequency $F_c$ of 1.575 GHz, a correlation time difference $\Delta t$ of 3.15 nanoseconds, and a time period Tp of one second, the residual frequency error $\Delta F$ is about five Hertz. In a step 144 the residual frequency error is compared to one-half Hertz and to five Hertz. When the residual error is greater than five Hertz, a step 146 corrects the frequency of the local NC signal for the residual local frequency error; and the process iterates beginning again at the step 122 by frequency converting the raw GPS signal samples with the local NC signal in order to obtain a new revision of the GPS signal code data. When the residual error is less than one-half Hertz, the method goes to a step 178 below.

In a step 150, when the residual local frequency error is between five Hertz and one-half Hertz, the error is corrected in the frequency of the local NC signal from the NC signal generator 44. In a step 152 the frequency converter 46 frequency downconverts the same stored GPS signal samples to baseband a second time by multiplying by the corrected local NC signal in order to obtain new GPS signal code data. In a step 154 the epoch timer 54 provides timing signals for segmenting the GPS signal code data in super chunks where each super chunk is one-hundred epochs long (one-hundred milliseconds). The selectable inverter 48 either inverts or non-inverts groups of twenty epochs within the super chunks according to the data bit timer 50 using information for the polarities of the GPS data bits either received from the base 12 or determined in the step 132 above. The combiner 52 combines the inverted or non-inverted epochs within each super chunk to form a representative epoch. For one second of GPS signal code data for super chunks of one-hundred epochs each, there are ten super chunk representative epochs. Alternatively, representative epochs for as few as two super chunks are determined, for example, a super chunk of epochs at the start of the GPS signal code data and a super chunk of epochs at the end of the GPS signal code data while the interior super chunks of epochs are ignored.

In a step 162 the correlator 58 correlates the super chunk representative epochs against the replica epoch from the code replica generator 56 by trying one phase or time offset and then another of the replica until the phases or time offsets are found that have the highest correlation to the representative. By using the correlation times determined in the step 132 above, only a few phase offsets need be tried. In a step 164 the microcontroller 36 interpolates the correlation times for the best matches to the respective super chunk representative epochs in order to improve time measurement resolution. In a step 172 the microcontroller 36 in a similar manner to the step 142 above determines a correlation time difference that best fits the variation in interpolated correlation times across the time period of the raw GPS signal samples and converts the correlation time difference to a residual frequency error. In a step 174 the microcontroller 36 compares the residual frequency error to one-half Hertz. In a step 176 when the frequency error is greater than one-half Hertz, the method returns to the step 150 where the NC signal generator 44 readjusts the frequency of the local NC signal to correct for the residual error.

In a step 178, when the residual local frequency error is less than one-half Hertz, the NC signal generator 44 corrects the frequency of the local NC signal. In a step 180 the frequency converter 46 frequency downconverts the same stored GPS signal samples to baseband by multiplying the samples by the local NC signal in order to obtain another revision of the GPS signal code data. In a step 182 the selectable inverter 48 inverts groups of epochs according to the polarities from the data bit timer 50 of the GPS data bits and the combiner 52 combines the epochs for the entire time period, preferably about one second, of the GPS signal code data into a single combination representative epoch. In a step 184 the correlator 58 correlates the combination representative epoch against the replica epoch from the code replica generator 56. In a step 186 microcontroller 36 interpolates the correlation time. In a step 188 the microcontroller 36 computes a pseudorange from the interpolated correlation time. Additional pseudoranges are computed in parallel using the same raw GPS signal samples and the Doppler frequency shifts, epoch time offsets, replica codes, and GPS data bits corresponding to each of the GPS satellites and/or pseudolites for which the pseudoranges are to be determined. Because the same local reference frequency error effects the acquisition of the GPS signals for all the GPS satellites and pseudolites, the residual frequency error information corresponding to a first GPS satellite or pseudolite can be used to improve the estimate of the residual frequency error corresponding to the other GPS satellites and pseudolites. In a step 192 the radio transceiver 34 and radio antenna 32 transmits the radio signal having the pseudoranges back to the base 12. In a step 194 the GPS receiver 20 returns to the low power standby mode. And, in a step 196 the base 12 uses the pseudoranges to compute the location of the GPS receiver 20. Alternatively, the microcontroller 36 uses the pseudoranges to compute the location of the GPS receiver 20 and then displays the location to a user through the I/O interface 36 and/or transmits information for the location through the radio transceiver 34 to the base 12.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for acquiring a direct sequence spread spectrum (DSSS) signal, comprising steps of:
   using a local frequency for frequency converting said DSSS signal to DSSS signal code data;
   combining code epochs for at least two chunks of said DSSS signal code data for determining at least two chunk representative epochs corresponding respectively to said at least two chunks, each of said chunks having two or more said code epochs;
   correlating said at least two chunk representative epochs to a replica epoch for determining at least two chunk correlation times corresponding respectively to said at least two chunk representative epochs;
   determining a correlation time difference from said chunk correlation times; and
   correcting said local frequency with a correction based upon said correlation time difference for providing a corrected local frequency for use in acquiring said DSSS signal.

2. The method of claim 1, wherein:
   said DSSS signal is a global positioning system (GPS) signal.

3. The method of claim 1, further comprising a step of:
   inverting certain said code epochs according to a polarity of a current DSSS data bit before the step of combining code epochs.

4. The method of claim 1, further comprising steps of:
   sampling said DSSS signal for providing DSSS signal samples; and
   storing said DSSS signal samples; and wherein
   the step of using said local frequency for frequency converting includes a step of frequency converting said DSSS signal samples with said local frequency for providing said DSSS signal code data.

5. The method of claim 4, further comprising steps of:
   receiving a radio signal having frequency information predictive of a frequency of said DSSS signal;
   determining an adjustment for said local frequency from said frequency information; and wherein:
   the step of frequency converting said DSSS signal samples further includes a step of adjusting said local frequency according to said adjustment.

6. The method of claim 4, further comprising steps of:
   using said corrected local frequency for frequency converting said stored DSSS signal samples to a second said DSSS signal code data for further use in acquiring said DSSS signal.

7. The method of claim 6, further comprising steps of:
   combining said code epochs for at least two super chunks of said second DSSS signal code data for determining at least two super chunk representative epochs corresponding respectively to said at least two chunks, said super chunks having more said code epochs than said chunks;
   correlating at least two said super chunk representative epochs to said replica epoch for determining at least two super chunk correlation times corresponding respectively to said at least super chunk representative epochs;
   determining a second correlation time difference from said super chunk correlation times; and
   correcting said corrected local frequency with a correction based upon said second correlation time difference for providing a second corrected local frequency for use in acquiring said DSSS signal.

8. The method of claim 1, further including steps of:
   receiving said DSSS signal as an airwave at a radio frequency with a substantially omni-directional antenna.

9. A method for receiving a global positioning system (GPS) signal, comprising steps of:
   combining two or more epochs of GPS signal code data in at least two chunks for determining at least two chunk representative epochs, said chunk representative epochs corresponding to said chunks, respectively;
   correlating said chunk representative epochs to a replica epoch for determining chunk correlation times; and
   determining a correlation time difference from said chunk correlation times and determining a pseudorange to a transmitter of said GPS signal from said chunk correlation times when said correlation time difference is indicative of a frequency error less than a threshold.

10. A receiver for acquiring a direct sequence spread spectrum (DSSS) signal, comprising:
    a frequency converter for using a local frequency for frequency converting a representation of said DSSS signal to DSSS signal code data;
    a combiner for combining code epochs for at least two chunks of said DSSS signal code data for determining at least two chunk representative epochs corresponding respectively to said at least two chunks, each of said chunks having two or more said code epochs;
    a correlator for correlating said at least two chunk representative epochs to a replica epoch for determining at least two chunk correlation times corresponding respectively to said at least two chunk representative epochs; and
    a microcontroller for determining a correlation time difference from said chunk correlation times and using said correlation time difference for providing a correction for said local frequency for use in acquiring said DSSS signal.

11. The receiver of claim 10, wherein:
    said DSSS signal is a global positioning system (GPS) signal.

12. The receiver of claim 10, further comprising:
    a selectable inverter for inverting certain said code epochs of said DSSS signal code-data according to a polarity of a current DSSS data bit before said code epochs are combined.

13. The receiver of claim 10, further comprising:
    a sampler for sampling said DSSS signal for providing DSSS signal samples; and
    a memory coupled to the sampler for storing said DSSS signal samples; and wherein
    the frequency converter is for using said DSSS signal samples as said representation of said DSSS signal for frequency converting to said DSSS signal code data.

14. The receiver of claim 13, further comprising:
    a radio transceiver for receiving a radio signal having frequency information predictive of a frequency of said DSSS signal;
    a signal generator coupled to the frequency converter for pre-adjusting said local frequency according to a frequency adjustment; and wherein:
    the microcontroller is for using said frequency information for providing said frequency adjustment.

15. The receiver of claim 13, wherein:
the frequency converter is further for using said corrected local frequency for frequency converting said stored DSSS signal samples to a second said DSSS signal code data for further use in acquiring said DSSS signal.

16. The receiver of claim 15, wherein:
the combiner is further for combining said code epochs for at least two super chunks of said second DSSS signal code data for determining at least two super chunk representative epochs corresponding respectively to said at least two super chunks, said super chunks having more said code epochs than said chunks;
the correlator is further for correlating said at least two super chunk representative epochs to said replica epoch for determining at least two super chunk correlation times corresponding respectively to said at least two super chunk representative epochs; and
the microcontroller is further for determining a second correlation time difference from said super chunk correlation times and using said second correlation time difference for providing a second correction for said local frequency for use in acquiring said DSSS signal.

17. The receiver of claim 10, further comprising:
an antenna having a substantially omni-directional radiation pattern for receiving said DSSS signal as an airwave at a radio frequency.

18. A receiver for receiving a global positioning system (GPS) signal, comprising:
a combiner for combining two or more epochs of GPS signal code data in at least two chunks for determining at least two chunk representative epochs, said chunk representative epochs corresponding respectively to said chunks;
a correlator for correlating said chunk representative epochs to a replica epoch for determining chunk correlation times; and
a microcontroller for determining a correlation time difference from said chunk correlation times and determining a pseudorange to a transmitter of said GPS signal from said chunk correlation times when said correlation time difference is indicative of a frequency error less than a threshold.

19. A method for receiving a global positioning system (GPS) signal, comprising steps of:
frequency downconverting a representation of said GPS signal with a local frequency for providing GPS signal code data;
combining epochs in at least two chunks of said GPS signal code data for determining chunk representative epochs corresponding respectively to said chunks, said chunks having two or more epochs;
correlating at least two said chunk representative epochs to a replica epoch for determining chunk correlation times corresponding respectively to said chunk representative epochs;
determining a correlation time difference from said chunk correlation times for providing a corrected local frequency; and
frequency converting said representation of said conducted GPS signal with said corrected local frequency for providing corrected GPS signal code data for use in acquiring said GPS signal.

20. A receiver for receiving a global positioning system (GPS) signal, comprising:
a digital signal processor for processing a representation of said GPS signal for determining a pseudorange to a transmitter transmitting said GPS signal, the digital signal processor including a frequency converter for using a local frequency for frequency downconverting said representation of said GPS signal and providing GPS signal code data; a combiner for combining epochs in at least two chunks of said GPS signal code data for determining chunk representative epochs corresponding respectively to said chunks, said chunks having two or more epochs; and a correlator for correlating at least two said chunk representative epochs to a replica epoch for determining chunk correlation times corresponding respectively to said chunk representative epochs; and
a microcontroller for determining a correlation time difference from said chunk correlation times; and when said correlation time difference is indicative of a frequency error of said local frequency less than a threshold, using said chunk correlation times for determining said pseudoranges.

21. A system for determining a global positioning system (GPS)-based location, comprising:
a base for transmitting a radio signal including information predictive of a frequency of a GPS signal; and
a GPS receiver including a transceiver for receiving said radio signal; a frequency converter for using said predictive frequency information for frequency converting a representation of said GPS signal to GPS signal code data; a combiner for combining epochs within at least two chunks of said GPS signal code data for determining chunk representative epochs corresponding respectively to said chunks, said chunks having two or more epochs; a correlator for correlating at least two said chunk representative epochs to a replica epoch for determining chunk correlation times corresponding respectively to said chunk representative epochs; and a microcontroller for determining a correlation time difference from said chunk correlation times and determining a correction for a local frequency from said correlation time difference, said local frequency for use in acquiring said GPS signal.

22. A system for determining a global positioning system (GPS)-based location, comprising:
a base for transmitting a radio signal including information predictive of a frequency of a GPS signal; and
a GPS receiver including a transceiver for receiving said radio signal; a frequency converter for using said predictive frequency information for frequency converting a representation of said GPS signal to GPS signal code data; a combiner for combining two or more epochs within at least two chunks of said GPS signal code data for determining at least two chunk representative epochs, said chunk representative epochs corresponding respectively to said chunks; a correlator for correlating said chunk representative epochs to a replica epoch for determining chunk correlation times; and a microcontroller for determining a correlation time difference and for determining a pseudorange to a transmitter of said GPS signal from said chunk correlation times when said correlation time difference is indicative of a frequency error less than a threshold.

23. The system of claim 22, wherein:
said transceiver is further for transmitting information for said pseudorange to said base.

* * * * *